(12) United States Patent
Cayeux

(10) Patent No.: US 12,504,308 B2
(45) Date of Patent: Dec. 23, 2025

(54) METHOD AND APPARATUS FOR MANAGING A FLOW OUT FROM A WELLBORE DURING DRILLING

(71) Applicant: Norce Innovation AS, Stavanger (NO)

(72) Inventor: Eric Cayeux, Sandnes (NO)

(73) Assignee: Norce Innovation AS, Stavanger (NO)

( * ) Notice: Subject to any disclaimer, the term of this patent is extended or adjusted under 35 U.S.C. 154(b) by 454 days.

(21) Appl. No.: 17/904,867

(22) PCT Filed: Feb. 22, 2021

(86) PCT No.: PCT/NO2021/050044
§ 371 (c)(1),
(2) Date: Aug. 23, 2022

(87) PCT Pub. No.: WO2021/172997
PCT Pub. Date: Sep. 2, 2021

(65) Prior Publication Data
US 2023/0125603 A1    Apr. 27, 2023

(30) Foreign Application Priority Data

Feb. 25, 2020    (NO) .................................... 20200213

(51) Int. Cl.
*G01F 1/82* (2006.01)
*E21B 47/10* (2012.01)
(Continued)

(52) U.S. Cl.
CPC ............ *G01F 1/8413* (2013.01); *E21B 47/10* (2013.01); *G01F 1/30* (2013.01); *G01F 1/82* (2013.01); *G01N 9/002* (2013.01)

(58) Field of Classification Search
CPC ........................................................ G01F 1/82
See application file for complete search history.

(56) References Cited

U.S. PATENT DOCUMENTS 3,841,144 A    10/1974 Baldwin
5,257,530 A    11/1993 Beattie et al.
(Continued)

FOREIGN PATENT DOCUMENTS

WO    WO-9309405 A1 *  5/1993  ............ E21B 47/101
WO    WO 2018/081687 A1  5/2018

OTHER PUBLICATIONS

Search Report issued in GB Application No. 2314440.5, dated Oct. 3, 2023.
(Continued)

*Primary Examiner* — John E Breene
*Assistant Examiner* — Alex T Devito
(74) *Attorney, Agent, or Firm* — Knobbe, Martens, Olson & Bear, LLP

(57) ABSTRACT

A flowmeter apparatus is for determining a volumetric flowrate for a well flow out from a wellbore, by means of a mass flowmeter, which is configured for receiving well flow and for measuring a mass flow rate of the well flow. At least one mass density measuring apparatus, is fluidly connected to the mass flowmeter upstream of a first inlet or downstream of a first outlet, or both. The mass flow rate of the well flow can be measured using a measuring wheel rotatably arranged below a funnel second section arranged to receive at least a portion of the well flow. A system for determining a volumetric flowrate for a well flow out from a wellbore includes the flowmeter apparatus arranged on a platform, rig, vessel, or other topside location, and connected between a riser and downstream processing equipment.

21 Claims, 7 Drawing Sheets

(51) Int. Cl.
    *G01F 1/30*          (2006.01)
    *G01F 1/84*          (2006.01)
    *G01N 9/00*        (2006.01)

(56) References Cited

U.S. PATENT DOCUMENTS

| | | | |
|---|---|---|---|
| 5,359,900 A | | 11/1994 | Hafner |
| 5,370,001 A | * | 12/1994 | LaBrecque ............... G01F 1/82 73/861.353 |
| 2001/0050170 A1 | * | 12/2001 | Woie ..................... E21B 49/008 166/250.07 |
| 2008/0028838 A1 | | 2/2008 | Andersen et al. |
| 2014/0238125 A1 | | 8/2014 | Parrington |
| 2016/0025531 A1 | | 1/2016 | Bischoff et al. |
| 2017/0306751 A1 | | 10/2017 | Harrison et al. |

OTHER PUBLICATIONS

Norwegian Search Report issued in Norwegian Application No. 2020213, dated Sep. 24, 2020.
International Search Report issued in International Application No. PCT/NO2021/050044, mailed on May 6, 2021.

* cited by examiner

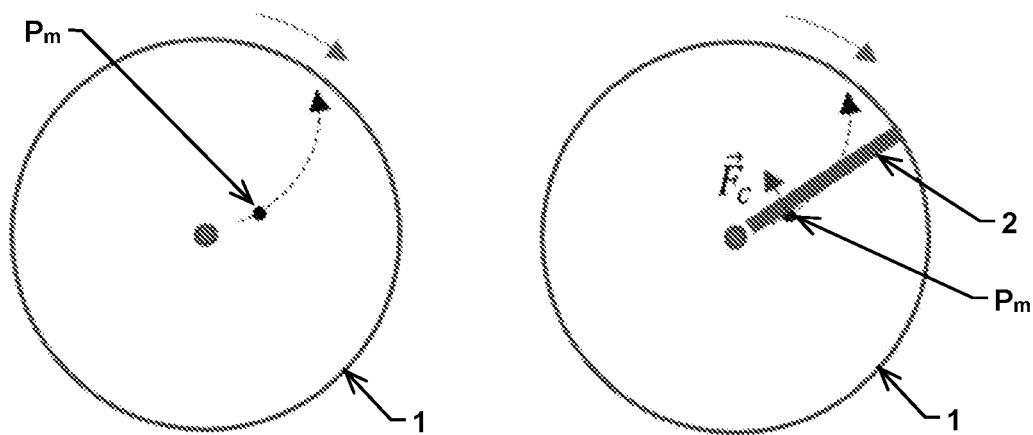
Fig. 1      (a) (prior art)      (b) (prior art)
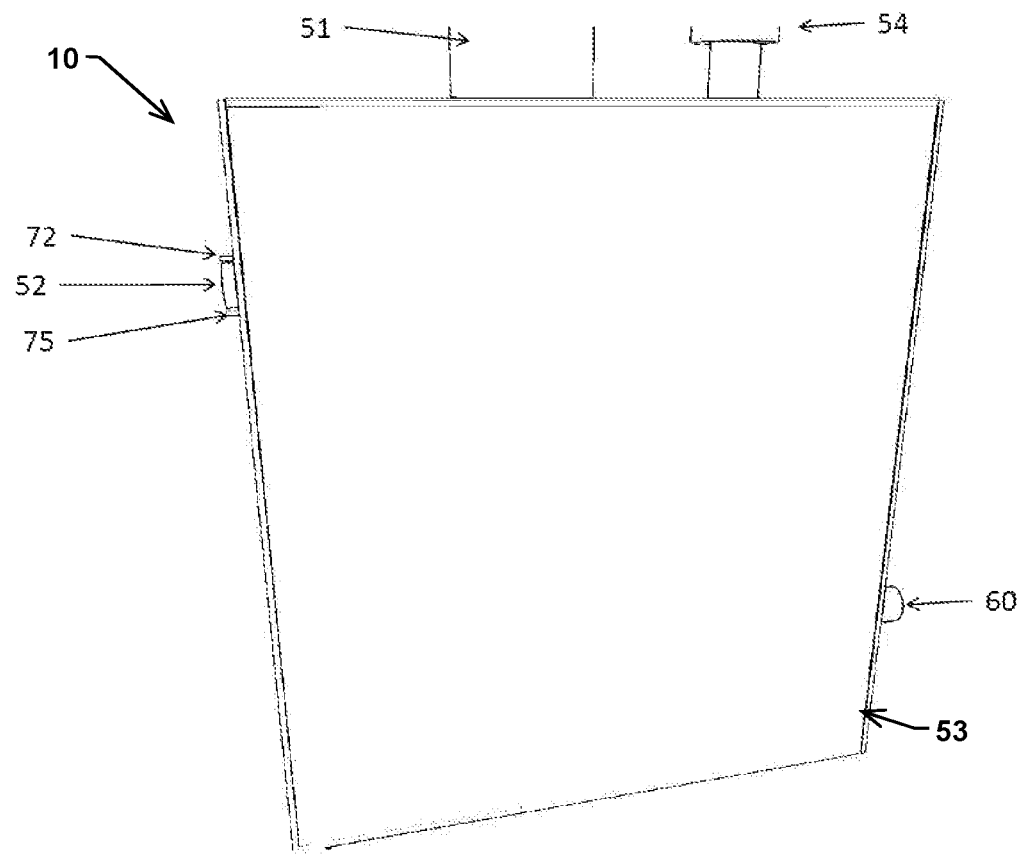
Fig. 2

METHOD AND APPARATUS FOR MANAGING A FLOW OUT FROM A WELLBORE DURING DRILLING

TECHNICAL FIELD OF THE INVENTION

The invention concerns the drilling of wellbores in subterranean formations, and particularly the management of fluids and entrained particles out from a wellbore at a topside location during drilling. More particularly the invention concerns an apparatus as set out by the preamble of claim 1, a system as set out by the preamble of claim 13, a method as set out by the preamble of claim 16, and a method as set out by the preamble of claim 21.

BACKGROUND OF THE INVENTION

During drilling operations in subterranean formations in over-balanced conditions, the unexpected flow of formation fluids into the wellbore may result in the release of hydrocarbons at the rig site with an associated risk of fire or explosion. This is usually called a formation fluid influx or a kick. Another situation is when drilling fluid flows into formation, for instance because of naturally fractured rocks or after fracturing the formation as the consequence of an excessive wellbore pressure with regards to the formation fracture pressure limit. This results in a lost circulation drilling event with the potential consequence of losing substantial amount of drilling fluids and in the worst case scenario not having enough drilling fluid to maintain an overbalance of the wellbore pressure with regards to the formation rock pore pressure. It is therefore necessary to check the total mass balance of drilling fluid in the drilling system for any external causes that would result in abnormal fluid gains or losses. The mass balance analysis requires to account for the volumetric changes associated with drillstring movements, drilling and hole opening and the associated transport and separation of cuttings, compressibility and thermal expansion of the materials involved in the drilling system, and drilling fluid displacements resulting from pumping.

Unfortunately, the standard instrumentation at the rig site is far from being ideal to perform such a detection with an acceptable degree of accuracy.

Presently, there are typically two ways of measuring the volumetric flowrate out of the wellbore: a direct measurement of the flow, and an indirect measurement based on the variation of pit volume.

The indirect method is not ideal, because pit volume is influenced by other activities that render the interpretation of its variations rather complicated. For example, each time the mud pump rate is changed, the amount of drilling fluid that is retained in the flowlines and mud treatment equipment changes. Variations of volumetric flowrates may thus occur each time the mud pumps are stopped and resumed while making a connection.

It is therefore rather complex to automatically detect a kick situation during a connection. For example, recently developed algorithms are prone to give false alarms as the result of direct mixing in the pit or a pit transfer: observing an abnormal active pit volume while the mud pumps are stopped and at the same time observing that the flow paddle opening does not return to zero but stays at 25%, would tend to indicate that there is a kick, but it may also be an indication of a transfer of mud from the trip tank to the active pit. The accumulation of cuttings in the return flowline may also impact the retention of drilling fluid in the return flowline.

Direct flow measurement is typically based on a flow paddle placed in the return flowline, for example close to the annulus outlet. However, the flow paddle is a very crude instrument which can only be used to give a gross indication of the flowrate out of the well. Also, flow paddle is generally incapable of giving any readings below a certain flowrate level, and the paddles are prone to getting stuck in one position due to particles accumulating on its hinges.

More seldom, a vibrating-tube Coriolis flowmeter may be utilized as a direct flow measurement. The vibrating-tube Coriolis flowmeter is at its basis a densitometer which has been modified to measure the mass flowrate in addition to the fluid density. The well-known principle of a vibrating-tube densitometer is that the natural resonance frequency of a tube changes when its mass varies. Thus, when a tube is filled with a substance of a certain density, the internal volume of the tube being known, it is possible to extract the additional mass that is contained in the tube by recording the change of the resonance frequency of the tube. If in addition, the tube has an entry bent in one direction and an exit bent in the opposite direction, the circulation of fluid inside the vibrating tube causes forces on each of those two bends because of the Coriolis effect. As these forces are in opposite directions, they generate a torque on the vibrating tube which has a phase shift between the two sides of the vibrating tube. This phase shift is directly related to the mass flowrate. Combining the mass flowrate and density, it is then possible to determine the volumetric flowrate.

The publications US 2017/0306751 A1, US 2016/0245027 A1, and U.S. Pat. No. 7,549,319 B2 describe various Applications of densitometers and flowmeters in downhole (not topside) installations, in which the fluids are pressurized (related to e.g. measurement under pressure).

As discussed by Le Blay et al. ("A New Generation of Well Surveillance for Early Detection of Gains and Losses When Drilling Very High-Profile Ultradeepwater Wells, Improving Safety, and Optimizing Operating Procedures", Le Blay, F., Villard, E., Hilliard, S. et al., 2012, Society of Petroleum Engineers doi.org/10.2118/158374-MS) and Lafond et al. ("Automated Influx and Loss Detection System Based on Advanced Mud Flow Modeling", Lafond, A., Leblay, F., Roguin, G., & Ringer, M., 23 Sep. 2019, Society of Petroleum Engineers doi:10.2118/195835-MS), the vibrating-tube Coriolis flowmeter is very precise and can be trusted if it is filled with drilling fluid. However, this condition is not necessarily easily fulfilled on a drilling rig, because of the required footprint for this apparatus. Furthermore, depending on how the vibrating-tube Coriolis flowmeter is installed, cuttings may accumulate in the apparatus and therefore falsify measurements. Also, mud may coat the inside the vibrating tubes and cause systematic errors in the measurements. It is therefore necessary to clean the sensor regularly to remove cuttings and any mud residuals on the walls of the vibrating tubes, and the instrument is therefore, by itself, not a reliable means for obtaining the volumetric flowrate.

The prior art also includes U.S. Pat. No. 5,359,900 A (Häfner, H., 1994: "Apparatus for measuring the mass throughput of a flow of pourable material according to the Coriolis principle."), which describes another device that uses the Coriolis effect to measure the mass flowrate, namely a rotating wheel mass flowmeter. In this apparatus, a flowable material is directed toward the center of a rotating wheel equipped with several separating vanes. Referring to FIG. 1a, the centrifugal force applied to the flowable material (it may be a powder) tends to expulse it out of the wheel 1, but as it crosses different radial positions, the flowable material (indicated by mass particle $P_m$) changes direction because of the Coriolis effect. The flowable material $P_m$ is therefore pushed against the vane(s) 2 (FIG. 1b), thus generating a torque on the rotating wheel. In theory, this torque is directly related to the mass flowrate.

The prior art also includes U.S. Pat. No. 3,841,144 A (Baldwin W, 1974: "Sand detection probe") and US 2008/0028838 A1 (Andersen, M., Brandt, M., 2008: "System for Sand Detection at Constrictions or Flow Obstacles in a Pipe or Similar"). These publications describe the principle of measuring sand particles utilizing acoustic measurement in pipes, and their methods rely on the fact that sand particles are entrained with a liquid flow and collide with an obstacle where the sound detector is located.

It is a need for an instrument that requires less maintenance, and is more reliable and versatile that those of the prior art.

SUMMARY OF THE INVENTION

The invention is set forth and characterized in the main claim, while the dependent claims describe other characteristics of the invention.

It is thus provided a flowmeter apparatus, for determining a volumetric flowrate for a well flow out from a wellbore, characterized by:
  a mass flowmeter apparatus having a first inlet configured for receiving well flow and connected to an inlet flowline, a first outlet configured for discharging well flow to an outlet flowline, and means for measuring a mass flow rate of said well flow;
  at least one mass density measuring apparatus, fluidly connected to the mass flowmeter apparatus upstream of said first inlet or downstream of said first outlet, or both, via a second inlet and a second outlet, and comprising a mass density measuring device and a pump device means fluidly connected between the second inlet and the second outlet, whereby at least a portion of said well flow may be controllably fed through the mass density measuring apparatus,
wherein:
  the first inlet is fluidly connected to an inlet funnel first section and an inlet funnel second section; and
  the means for measuring a mass flow rate of said well flow comprises at least a measuring wheel rotatably arranged below said funnel second section and arranged to receive at least a portion of said well flow.

In one embodiment, the mass density measuring apparatus further comprises a cleaning system having a cleaning fluid inlet and a cleaning fluid outlet, and two three-way valves, one upstream of the mass density measuring device and one close to the second outlet, for cleaning the interior of said measuring device. The mass density measuring device may be a vibrating-tube type densitometer.

In one embodiment, the inlet is fluidly connected to an inlet funnel first section and an inlet funnel second section; said first section comprising a filter device dimensioned and arranged to prevent particles greater than a predetermined size from entering said inlet funnel second section. The flowmeter apparatus may further comprise a bypass conduit extending between the inlet funnel first section upstream of said filter device, and said first outlet.

The means for measuring a mass flow rate of said well flow comprises preferably at least a measuring wheel rotatably arranged below said funnel second section and arranged to receive at least a portion of said well flow; said means also comprising a drive unit and a torque sensor device. The measuring wheel is in one embodiment encased by a container, in a wall of at least a portion of which is arranged one or more impact sensors, configured to measure the sound levels and frequencies on the container wall. The well flow may be a drilling fluid (e.g. mud) containing a mixture of fluids and particles.

In one embodiment, the flowmeter apparatus comprises a control and processing unit, configured for receiving information via communications interfaces from at least one of the mass flowmeter apparatus, the one or more impact sensors, and the mass density measuring apparatus, and to provide information related to said well flow, for example a volumetric flow rate, and/or information concerning the mass, number and mass distribution of solid particles in said well flow, and the information concerning the mass, number and mass distribution of the solid particles are obtained by said one or more impact sensor.

In one embodiment, the flowmeter apparatus further comprising a gas sensor arranged in fluid connection with the container. The gas sensor may be fluidly connected to a region downstream of the inlet funnel first section.

It is also provided a system for determining a volumetric flowrate for a well flow out from a wellbore, comprising the flowmeter apparatus according to the invention arranged on a platform, rig, vessel, or other topside location, and wherein the inlet flowline is connected to a riser and the outlet flowline is connected to downstream processing equipment. In one embodiment, the flowmeter apparatus is arranged proximal to the riser annulus outlet. The invented system may comprise a pump arranged between the riser outlet and the inlet flowline.

It is also provided a method of determining a volumetric flowrate for a well flow out from a wellbore, comprising measuring a mass flowrate of the well flow, and measuring of the mass density of a portion of said well flow, characterized in that measurements are obtained by the flowmeter apparatus according to the invention, and by adjusting the rotational speed of the measuring wheel as a function of the mass flowrate of fluid flowing into the measuring wheel. The measuring wheel rotational speed is adjusted by adjustment of the rotational speed of a drive unit.

The mass and number of solid particles and their distribution in the well flow may be determined by sensing the sound levels and frequencies of particles impinging on a wall portion of the mass flowmeter apparatus container. The particles may be accelerated and thus are given an additional momentum before impinging on the wall portion. The mass density may be determined by extracting a fraction of the well flow, upstream or downstream of the mass flowmeter apparatus, and feeding said fraction through a densitometer.

It is also provided a method of determining the number of solid particles, and their mass and distribution in a flow, per unit of time, characterized by:
  accelerating the particles towards a wall structure comprising one or more impact sensors, at a predetermined or calculated acceleration;
  recording and processing the impacts detected by the sensor or sensors; and
  based on the impacts detected by the sensor or sensors, determine the number of solid particles in the flow; and
  based on the impact or vibrations in the wall structure detected by the sensor or sensors and by utilizing said predetermined or calculated acceleration, determine the mass of solid particles and their distribution in the flow, per unit of time.

In one embodiment of the method, the solid particles are entrained in a fluid or liquid flow, and the method further comprises:
recording frequency and amplitude for the flow as detected by the impact sensor or sensors;
establishing a first amplitude vs. frequency spectrum associated with solid particle impacts and a second amplitude vs. frequency spectrum associated with liquid impacts;
determining the mass, number, and distribution of solid particles per unit of time in the flow based on the first spectrum. In one embodiment, said predetermined or calculated acceleration is determined or calculated based on the rotational speed of a measuring wheel rotatably arranged and configured to receive and accelerate said flow; and by controlling said measuring wheel.

The invented flowmeter apparatus, comprising in its most fundamental form a mass flowmeter apparatus and a densitometer, requires little maintenance and yet provides reliable quantitative measurements. The invented flowmeter apparatus utilizes the Coriolis forces as a measurement principle, but unlike the vibrating tube mass flowmeter of the prior art, the apparatus does not need to be filled with drilling fluid in order to produce reliable data. Because of its measurement principle, cuttings cannot clog the apparatus and mud cannot form a layer at the surface of the instrument and therefore its precision stays unbiased for a long time. A fraction of the return well flow passes through the densitometer to obtain the mass density of the drilling fluid and therefore the volumetric flowrate can also be provided. The diverted fraction of the drilling fluid flow returns to the main flow before or immediately after the total fluid flow passes through the mass flowmeter, therefore ensuring a measurement of the total mass flowrate. The fraction of fluid flow that is diverted to the densitometer is smaller than the designed minimum sensitivity of the mass flowmeter, yet it is sufficiently large to allow for the passage of the drilling fluid with as little solid filtering as possible. For example, for a flowrate out sensor that is dimensioned to accept as much as 5000 l/min with a minimum sensitivity of 50 l/min, the diverted flow to the densitometer can be in the range of 10 l/min. A flowrate of 10 l/min can pass through pipes having a diameter of the order of magnitude of 25 mm and therefore only solid particles larger than a few millimeters, for instance 4 or 5 mm, need to be filtered out before the diverted flow enters the hydraulic circuit of the densitometer. Indeed, according to measurements made during drilling operations in the North Sea, A. Saasen, B. Dahl and K. Jødestøl, ("Particle Size Distribution of Top-Hole Drill Cuttings from Norwegian Sea Area Offshore Wells," Particulate Science and Technology, vol. 31, no. 1, pp. 85-91, 2013) report that 70% of the cuttings particles are smaller than 4 mm while drilling a 17½-in hole section and 80% of the cuttings particles are smaller than 4 mm when drilling a 12½-in hole section.

As an additional feature of the instrument measurement principle, it is possible to obtain information about the number of cuttings particles that pass through the apparatus per unit of time, as well as their particle mass distribution. Dissolved gases are also separated while the drilling fluid traverses the device and it is therefore possible to relocate a gas sensor (e.g. a chromatograph) inside the apparatus in order to obtain a gas composition very close to the well outlet. The quantitative measurement of the flowrate out of a well with an apparatus that can be retrofitted on existing rigs and that necessitates little maintenance, open for the possibility to achieve automatic gain/loss detection with few false alarms, therefore improving substantially safety of conventional drilling operations.

BRIEF DESCRIPTION OF THE DRAWINGS

These and other characteristics of the invention will become clear from the following description of embodiments of the invention, given as non-restrictive examples, with reference to the attached schematic drawings, wherein:

FIGS. 1a and 1b illustrate the prior art and are sketches illustrating the principle of how a measuring wheel may be used to estimate a mass flowrate;

FIG. 2 is a front view of an embodiment of the invented flowmeter apparatus; illustrating the apparatus outer housing and notable connection fittings;

DETAILED DESCRIPTION OF EMBODIMENTS OF THE INVENTION

Figure 3:
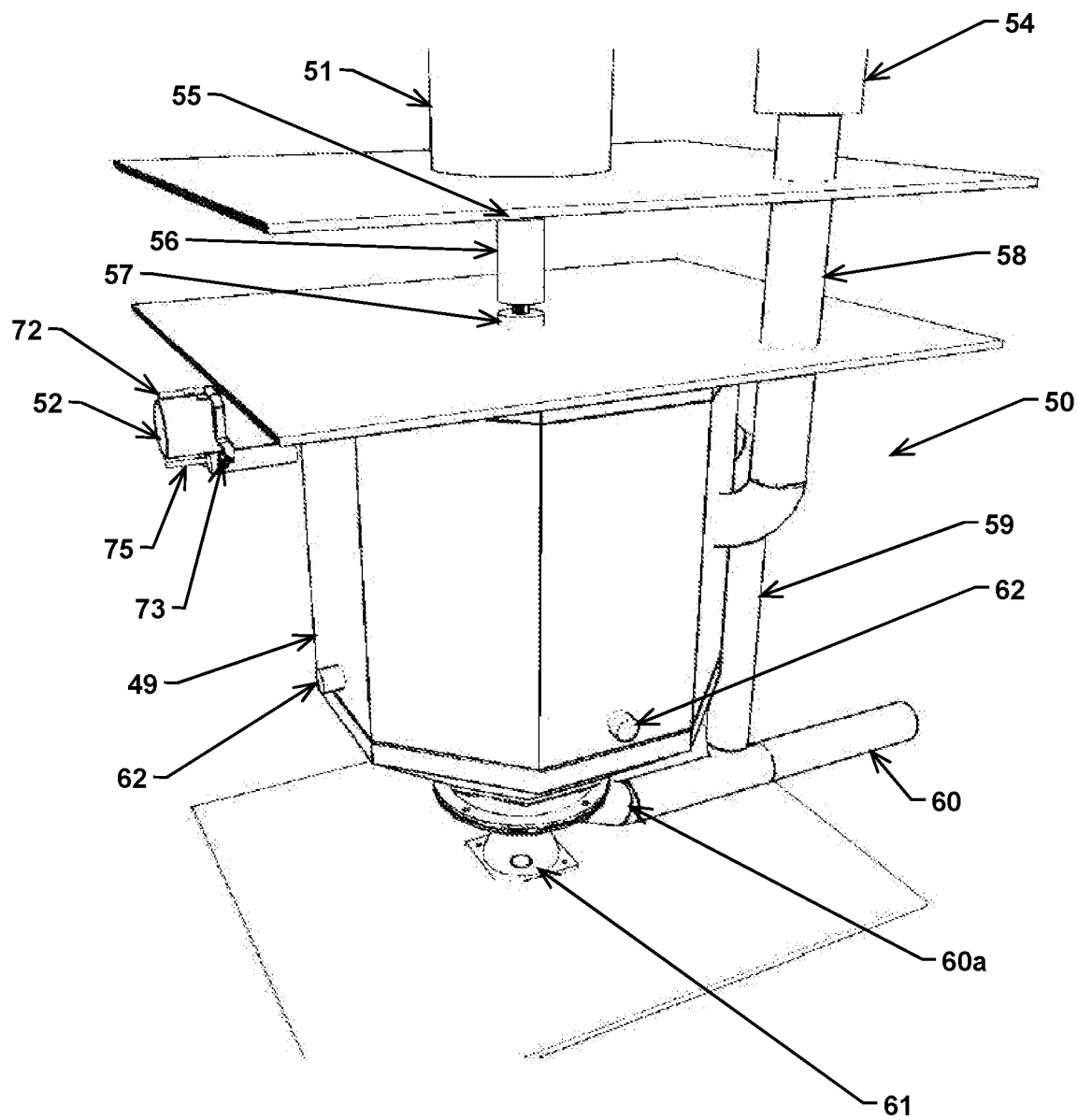
FIG. 3 is a perspective view corresponding to FIG. 2, but the housing has been removed for illustration purposes.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Figure 7:
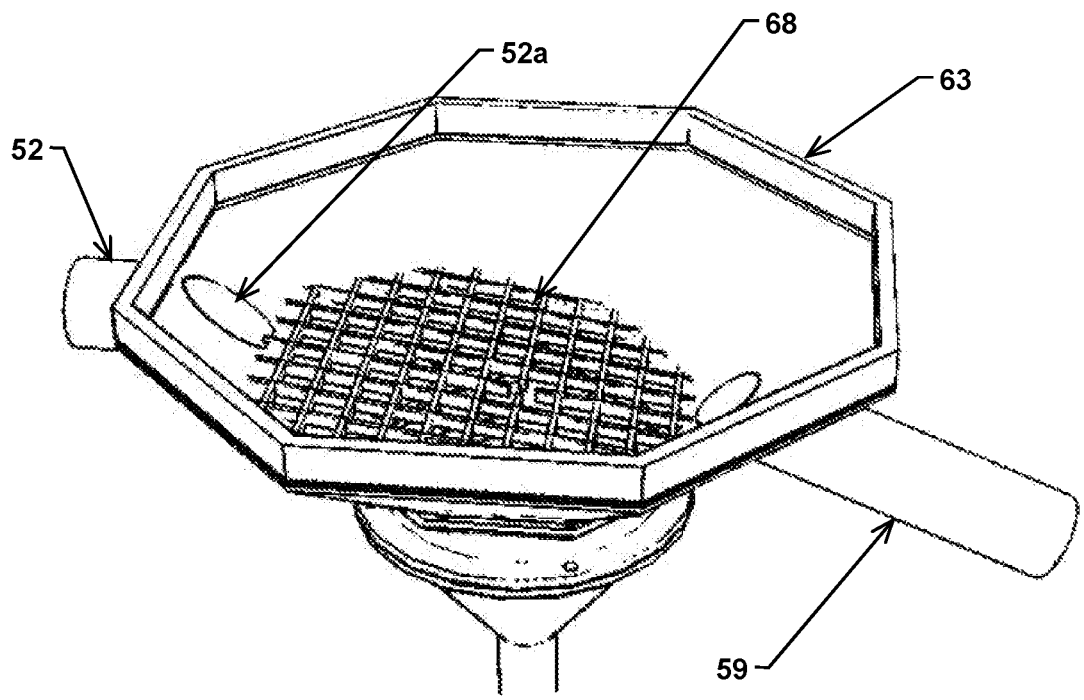
FIG. 7 corresponds to FIG. 4, but shows only an inside view of the inlet funnel first (upper) region.

Referring initially to FIG. 2, the invented flowmeter apparatus 10 may conveniently be arranged inside a housing 53 (only front plate illustrated). The apparatus 10, which is intended for topside installation (e.g. on a platform, rig, or surface vessel) and thus configured for operating under ambient atmospheric pressure, comprises a fluid inlet flowline 52 and a fluid outlet flowline 60. The flowline 52 connects to an inlet funnel 63 via an inlet 52a (hereinafter also referred to as a "first inlet"), as shown in FIG. 7. An outlet 60a (hereinafter also referred to as a "first outlet") connects to the fluid outlet flowline 60, as shown in FIG. 3.

Figure 11:
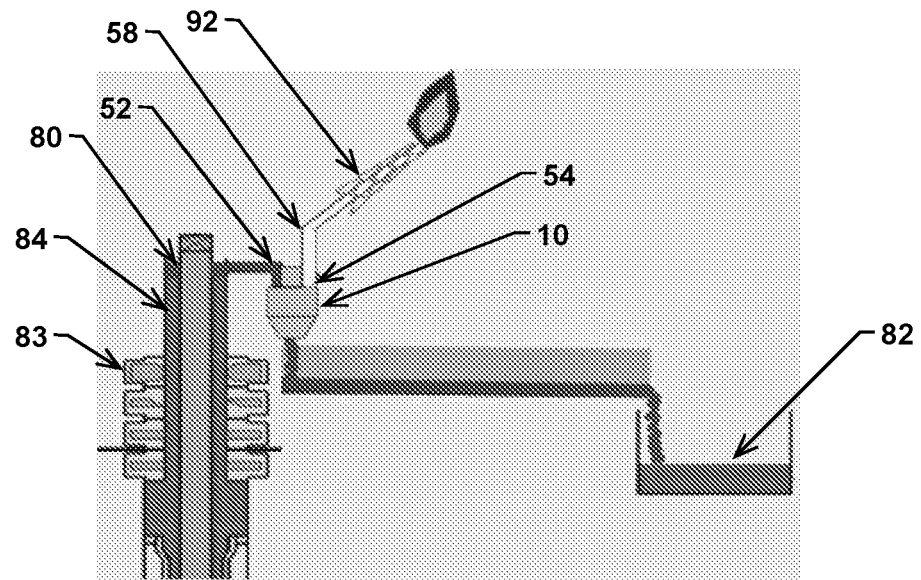
FIG. 11 is a schematic illustration of the invented flowmeter apparatus arranged in relation to the flowline annulus outlet on a topside location.
Figure 12:
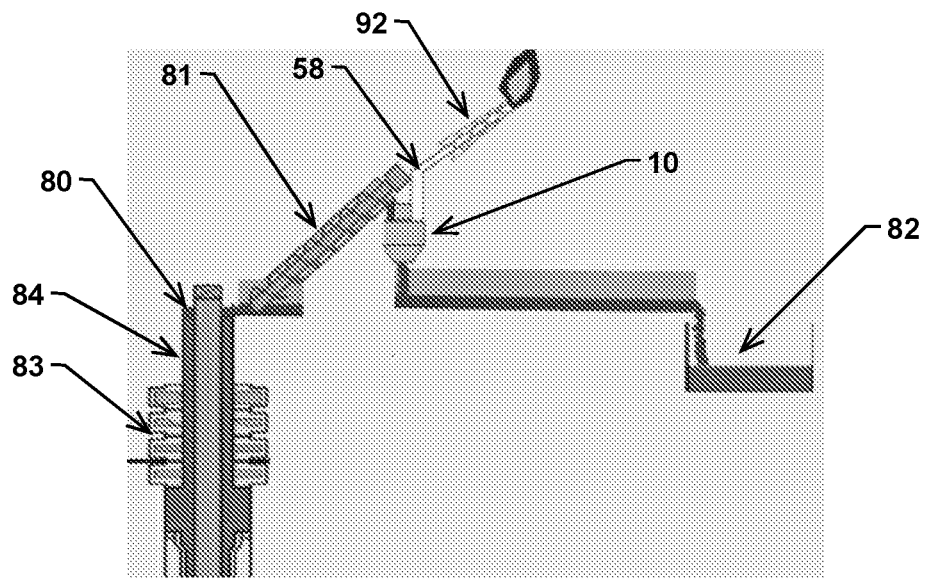
FIG. 12 is a schematic illustration of an Archimedes pump arranged between the flowline annulus outlet and the flowmeter apparatus, on a topside location.

When the apparatus 10 is in use, during a drilling operation, the inlet flowline 52 may be connected to a drilling fluid (e.g. mud) return line, and the fluid outlet flowline 60 may be connected to a drilling fluid processing system (e.g. mud pit, mud pump an return line). Examples of such installations are shown in FIGS. 11 and 12 and will be discussed below. Reference numbers 75 and 72 in FIG. 2 designate a cleaning fluid inlet and outlet, respectively, which will be described below.

Reference is now made to FIG. 3, which illustrates the flowmeter apparatus 10 without its housing 53. The flowmeter apparatus 10 comprises a mass flowmeter apparatus 50, in the illustrated embodiment in the form of a rotating wheel Coriolis mass flowmeter. The mass flowmeter apparatus 50 comprises a container 49 in which one or more impact sensors 62 are arranged in the container wall and configured to sense particle impacts on—and vibrations in—the container wall, particularly in the vicinity of the collecting funnel 66, described below. The impact sensors 62 may be piezoelectric sensors, as explained below, but other types of impact sensors are conceivable.

Figure 4:
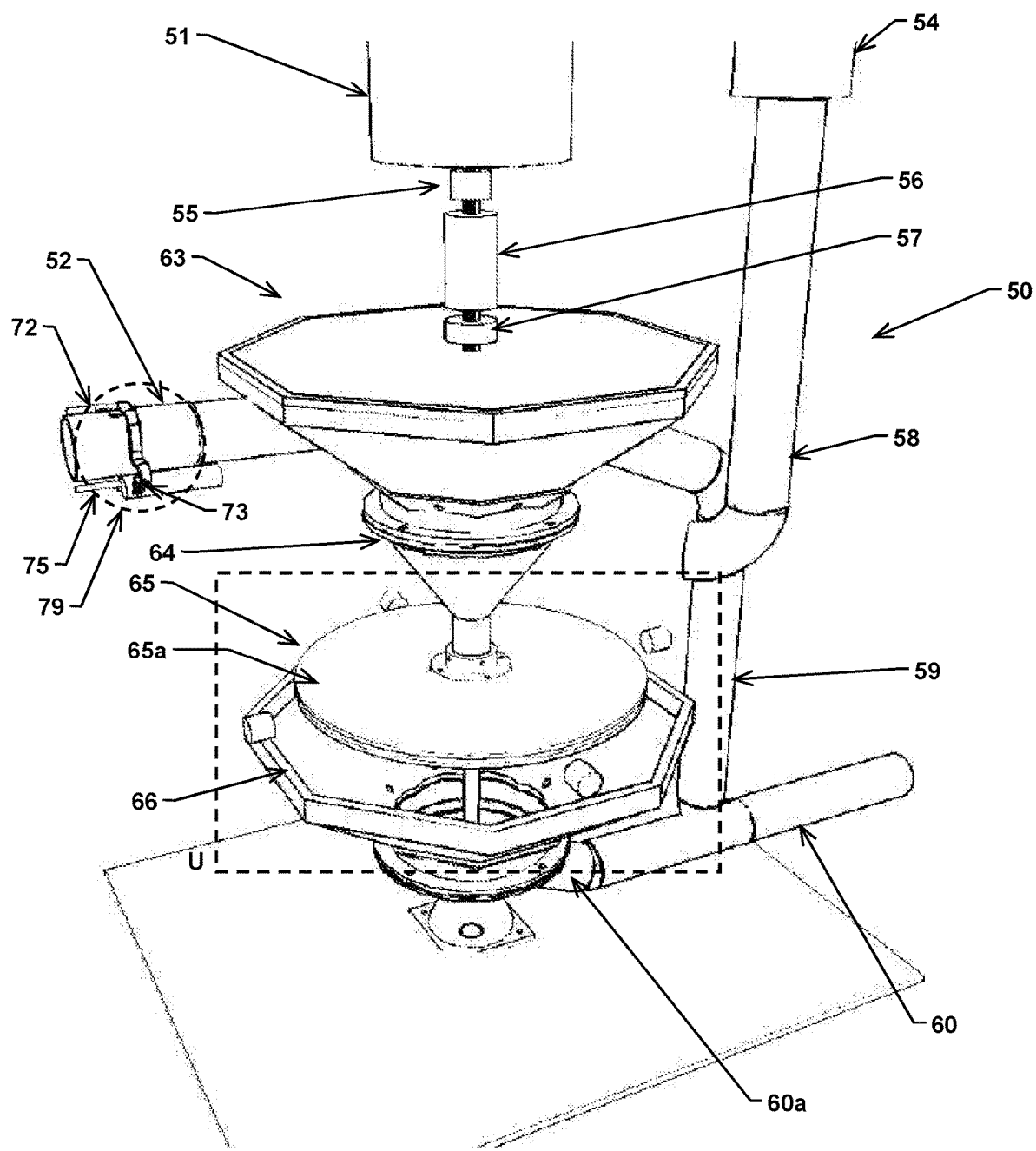
FIG. 4 corresponds to FIG. 3, but a container wall has been removed for illustration purposes.

Referring additionally to FIG. 4 (in which the container 49 wall has been removed for illustration purposes), an inlet funnel is at a first (upper) region 63 fluidly connected to the fluid inlet flowline 52. The inlet funnel is at a second (lower) region 64 fluidly connected to a measuring wheel 65, which is powered (rotated) by a shaft connected to a motor 51. The shaft is supported by (upper and lower) bearings 57, 61. A speed encoder 55 is arranged around the shaft and is configured to measure the rotational speed of the shaft and measuring wheel. A torque sensor 56 is also arranged around the shaft and configured to measure the torque imposed on the measuring wheel by the material flowing into the mass flowmeter apparatus. This torque sensed by the sensor 56 is directly related to the mass flowrate. In order to obtain a relation between torque and mass flowrate, it is important that the fluid gets pressed against the vane as quickly as possible while it gets ejected from the rotating wheel. It is also important that centrifugal forces dominate over viscous forces so that the resulting torque is as independent from the rheological behavior of the fluid as possible. To reach that condition, the rotational speed should be sufficiently high. In general, the measuring wheel rotational speed is governed by the mass flowrate in order to optimize the torque measurement. Therefore, the rotational speed of the motor 51 (and hence the measuring wheel) is adjusted as a function of the mass flowrate of fluid flowing into the measuring wheel. In general, the measuring wheel rotational speed is inversely proportional with the mass flowrate.

A collecting funnel 66 is connected to the container 49 and arranged below the measuring wheel 65, and is at its lower region connected to the outlet pipe (first outlet) 60a.

Referring additionally to FIG. 7, the inlet funnel first region 63 comprises an inclined coarse mesh 68 arranged in the funnel downstream of the inlet 52a to avoid large particles entrained in the wellflow from entering the measuring wheel. Such large particles are fed into the bypass pipe 59 which is connected to the fluid outlet flowline 60. There is thus no risk of clogging the apparatus, as particles of a size above the size allowed by the mesh 68 are not allowed to enter the measuring wheel.

A gas vent line 58 connects the interior of the container 49 with the ambient atmosphere or gas processing devices (not shown), via a gas sensor device (e.g. a gas chromatograph) 54, in order to vent any gases entrained in the drilling fluid.

Figure 5:
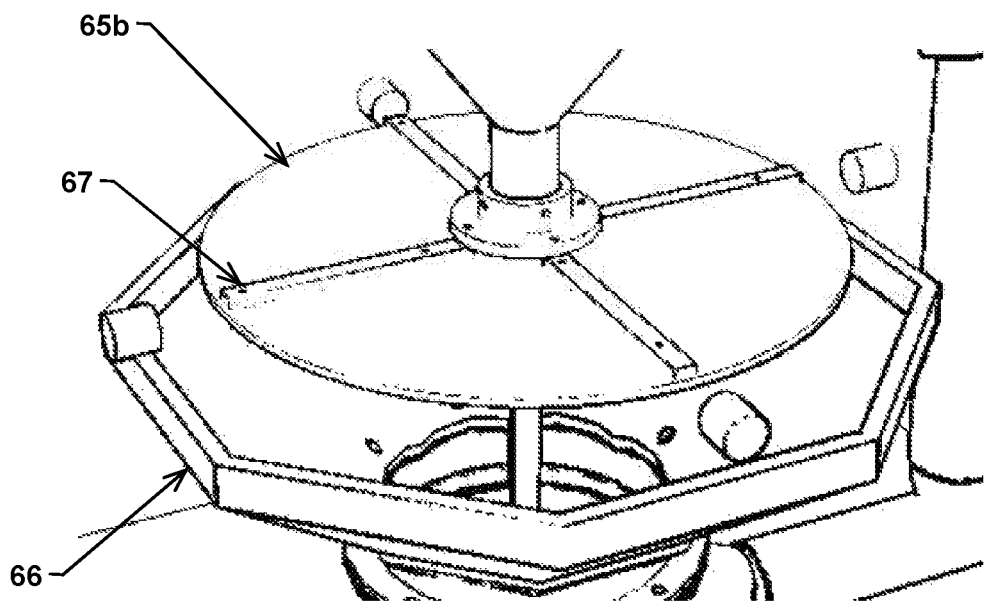
FIG. 5 is an enlarged view of the area "U" in FIG. 4, but an upper plate of the measuring wheel has been removed to illustrate the lower plate and the vanes.

The measuring wheel 65 comprises in the illustrated embodiment two parallel plates 65a,b connected to and arranged perpendicularly to the shaft. The vertical distance (along shaft axis) between the plates is determined based on operational parameters. For example, if the intention is to measure a large mass flow rate, then this distance is greater than if a smaller mass flow rate is to be measured. The distance between the upper and lower plates may be adjusted by control bars and actuators (not shown). Arranged between the plates 65a,b are a plurality of vanes 67 (four vanes illustrated in FIG. 5). The height of the vanes 67 is generally equal to or larger than the individual openings of the mesh 68.

Figure 9:
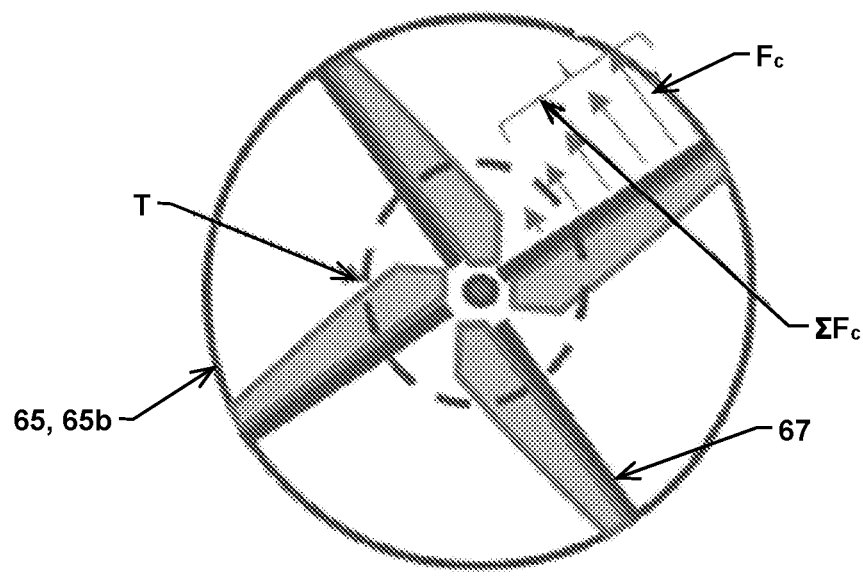
FIG. 9 is a schematic illustration, in plan view, illustrating the measuring wheel diameter and the relationship between a region of turbulent flow and a central region of undeveloped flow.

When the fluid enters the measuring wheel 65 at its center, it is rather dispersed. It takes some radial displacement of the fluid before it collects into a homogenous flow and presses on the vanes 67. So, it is only past a certain radial position that good flow conditions are obtained. On the other hand, at a larger radial position (indicated by circle T in FIG. 9), the Coriolis force is larger. It is therefore necessary to utilize a measuring wheel with a diameter of sufficient magnitude for the generated Coriolis forces to dominate. FIG. 9 illustrates how—during operation—the sum/$\Sigma F_c$ of Coriolis forces $F_c$ generated in the region of turbulent flow (e.g. outside of circle T) dominate over those created under conditions in which viscosity influences the forces.

Figure 10:
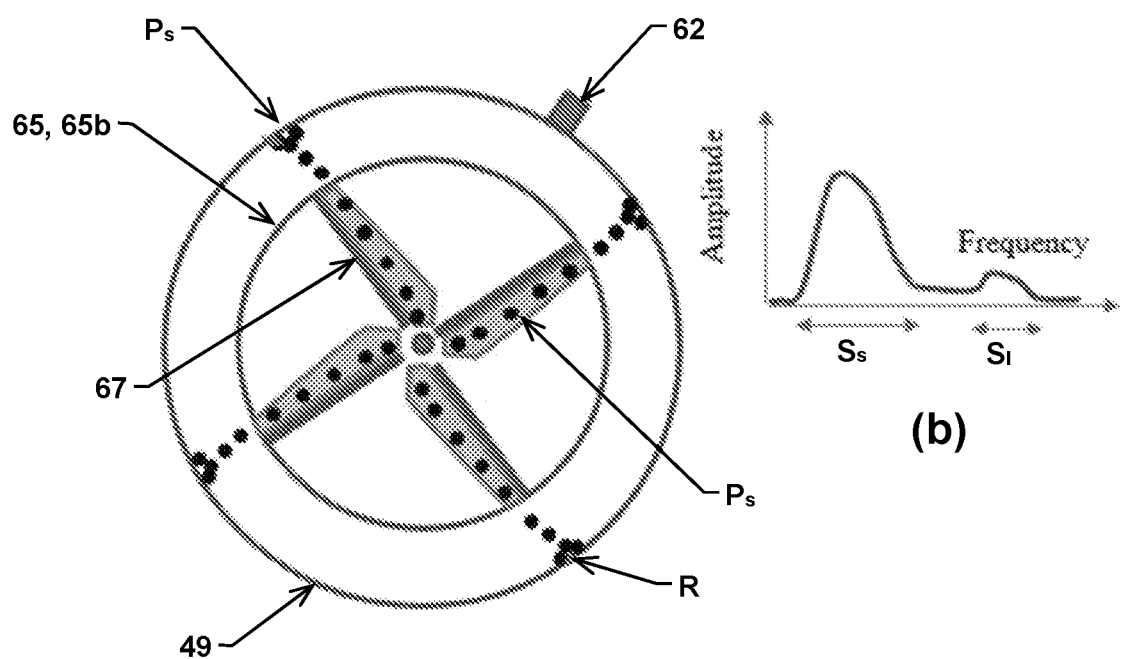
FIG. 10a is a schematic illustration, in plan view, of a sensor device mounted on a wall of the container near the collecting funnel and the measuring wheel, and arranged to detect sold particle impacts.
FIG. 10b illustrates how impact shocks of cuttings particles on the collecting funnel or container walls may be utilized to extract information about the mass and number of solid particles returned together with the drilling fluid.

During normal operation, the drilling fluid typically contains solid particles, e.g. cuttings, cavings. Referring to FIG. 10a, when these particles $P_s$ are ejected out of the measuring wheel 65 and collide at regions R with the inner wall of the container 49, where they cause impacts and vibration in the container wall and thus acoustic signals. In the illustrated embodiment, one or more impact sensors 62—here in the form of piezoelectric sensors—mounted on the container 49 wall provide for measuring the sound levels and frequencies on the container wall, and thus making it possible to obtain an indication of the mass and number of solid particles, and their particle mass distribution. As mentioned above, the prior art includes the principle of measuring sand particles in fluids in pipes or flowlines by utilizing acoustic measurement. Particles entrained with a liquid flow collide with an obstacle where a sound detector is located. The invented mass flowmeter apparatus differs from the prior art in that the particles, e.g. by utilizing the speed encoder and controlling the motor 51, are accelerated through their passage into the measuring wheel 65 and therefore gain an additional momentum that causes the shock with the receiving container wall. The measuring wheel 65 therefore serves as a particle-accelerating device, and may be designated as such. It will thus be understood that the particle-accelerating device 65 may have other forms and features than those described above.

With sufficient rotational speed of the measuring wheel 65 and a large enough diameter, the exit velocity distribution of the particles is somewhat narrow and therefore it is possible to extract from the shock energy of the particle against the wall, the mass of each particles without too much dependence on the actual fluid flowrate. As an example, FIG. 10b illustrates how the spectrum $S_s$ associated with solid particle impacts against the container wall is clearly discernible from the spectrum Si associated with liquids impacting against the wall. It is also important that the gap between the outer radius of the measuring wheel and the collecting funnel walls is sufficiently large to ensure that the fluid does not flow-back into the measuring wheel. However, this distance should not be so large that cuttings particles will not collide with the collecting funnel walls. Other types of impact sensors, for example fibre optic Bragg grating sensors, are conceivable. However, acoustic sensors and the procedure for determining particle size, mass flow rate and distribution as described above offer operational advantages over fibre optic sensors.

Figure 6:
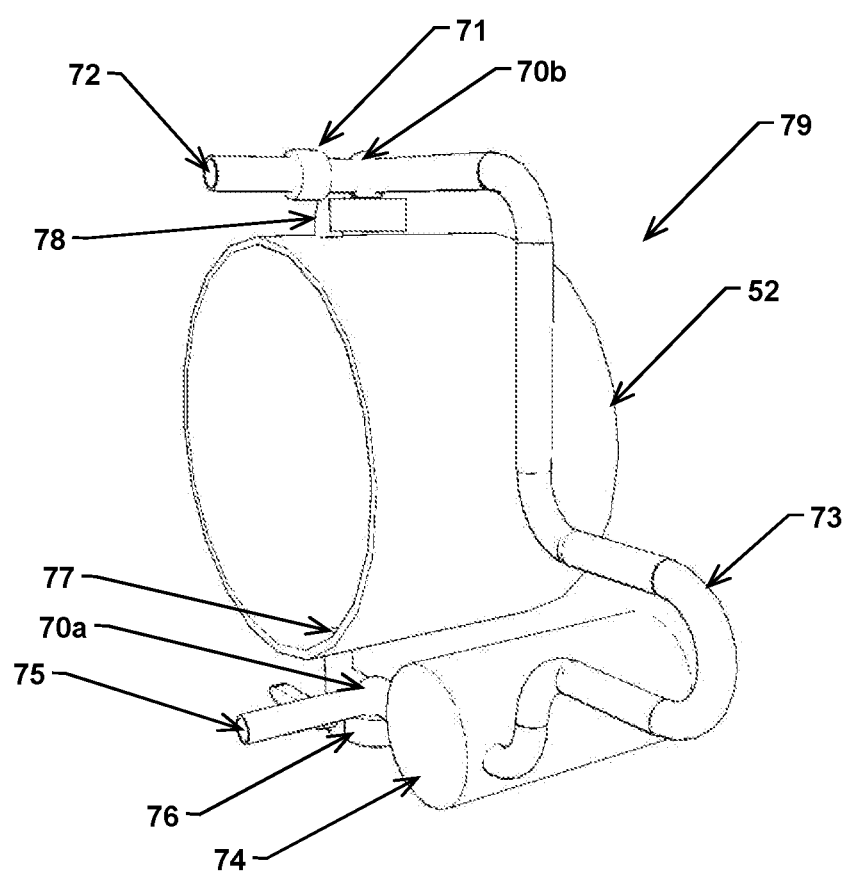
FIG. 6 is a schematic perspective view of a mass density measuring apparatus, connected to a fluid inlet flowline.

In order to obtain a volumetric flowrate, it is necessary to also measure the mass density of the fluid mix (drilling fluid). Therefore, the invented flowmeter apparatus 10 also comprises a mass density measuring apparatus 79, indicated as a dotted circle 79 in FIG. 4 and illustrated in more detail in FIG. 6. In FIG. 6, the mass density measuring apparatus 79 is shown as connected to a portion of the fluid flowline 52, upstream of the first inlet 52*a*. An inlet 77 (hereinafter also referred to as a "second inlet") is arranged to divert a portion of the flow from inside the fluid flowline 52. The second inlet 77 is preferably arranged in a lower portion of the fluid flowline wall and is furnished with a mesh or other restriction (not shown) such that only fluids and particles below a predetermined size are admitted into the mass density measuring apparatus 79. The second inlet 77 is fluidly connected to a pump device 74 which feeds the flow to a mass density measuring device (in the illustrated embodiment a densitometer) 73 via suitable conduits. The pump device 74 is dimensioned and controllable to obtain a desired flowrate through the mass density measuring device 73. The mass density measuring device 73 must be suitable for use in a multiphase flow, and may be a vibrating-tube type densitometer or a gamma ray densitometer, both of which per se are known in the art. The mass density measuring device 73 is fluidly connected to an outlet 78 (hereinafter also referred to as a "second outlet"), whereby the flow is returned to the fluid flowline 52 upstream of the first inlet 52*a*. The second outlet 78 is preferably arranged in an upper portion of the flowline. The mass density measuring apparatus 79 also includes a cleaning system, by means of which the mass density measuring device 73 may be flushed and cleaned as required. The cleaning system comprises the above-mentioned inlet 75 and outlet 72 and two three-way valves 70*a,b*, one upstream of the densitometer and one close to the second outlet 78, to ensure that water can be pumped through the densitometer. A turbidity sensor 71 is arranged downstream of the densitometer, by means of which the cleaning process may be stopped when the turbidity level at that point is sufficiently low. A drain valve 76 (closed during normal operation) is fluidly connected to the pump device. It should be noted that the mass density measuring apparatus 79 does not account for the larger solid particles (not admitted into the inlet 77), but the flow diversion may be designed to be only a small fraction of the maximum flow capacity of the apparatus. Therefore, the mass density can still be measured at very low flowrates. Although the figures illustrate the mass density measuring apparatus 79 being arranged upstream of the mass flowmeter apparatus 50, it should be understood that it may also be connected to the fluid outlet flowline 60, downstream of the first outlet 60*a* but preferably upstream of the bypass pipe 59 outlet.

Figure 8:
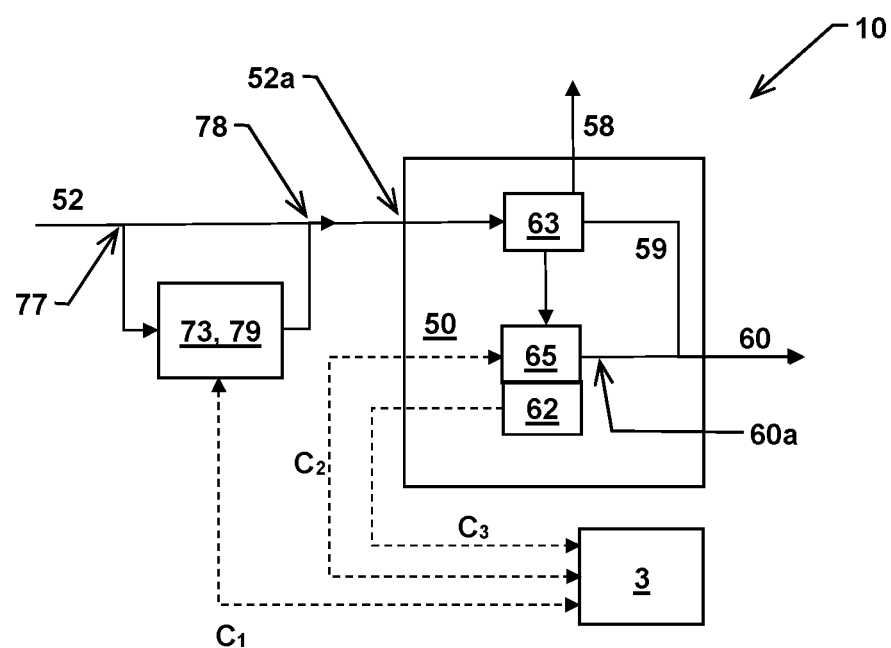
FIG. 8 is a flow diagram of the invented flowmeter apparatus, and is a schematic representation of the embodiment illustrated in FIGS. 2-7.

FIG. 8 is a schematic illustration of the flowmeter apparatus 10, and illustrates how a fraction of the return well flow (in flowline 52) may be diverted from the main flow (at 78) and passed through the densitometer 73 to obtain the mass density of the drilling fluid. Although not illustrated, a mass density measuring apparatus 79 may—alternatively or as a supplement—be arranged downstream of the mass flowmeter apparatus 50, connected to the first outlet 60*a* upstream of the bypass pipe 59 outlet.

FIG. 8 also illustrates that the flowmeter apparatus 10 comprises a control and processing unit 3, which may be located in the vicinity of the flowmeter apparatus or at a distal location. In a practical application, the control and processing unit 3 may be embodied as physically separate units located at different locations and interconnected via communication means known in the art. The control and processing unit 3 comprises input/output means and control means that are known in the art.

The control and processing unit 3 is connected to the mass density measuring apparatus 79 via a first communications interface $C_1$, to the mass flowmeter apparatus 50 via a second communications interface $C_2$, and to the impact sensor (or sensors) 62 via a third communications interface $C_3$. The communications interfaces may be any suitable communication means known in the art.

The mass density measuring apparatus 79 may thus be controlled as described above (e.g. controlling the pump device, valves, and cleaning system) via the first communications interface $C_1$, which also communicates data obtained by the mass density measuring device (densitometer) 73 to the control and processing unit 3.

The mass flowmeter apparatus 50 may thus be controlled as described above (e.g. controlling the measuring wheel motor) via the second communications interface $C_2$, which also communicates data from the mass flowmeter apparatus (e.g. data from the speed encoder and torque sensor) to the control and processing unit 3.

Combining the mass density obtained by the densitometer with the mass flowrate obtained by the mass flowmeter apparatus 50, the volumetric flowrate can thus be determined, e.g. by the control and processing unit 3. The diverted fraction of the drilling fluid flow is returned to the main flow in the flowline 52 (at 78) before the total fluid flow passes into the inlet 52*a* and through the mass flowmeter apparatus 50, therefore ensuring a measurement of the total mass flowrate. As explained above, the fraction of fluid flow that is diverted to the densitometer is smaller than the designed minimum sensitivity of the mass flowmeter, yet it is sufficiently large to allow for the passage of the drilling fluid with as little solid filtering as possible.

The impacts and vibration signals detected by the impact sensor (or sensors) 62 are sent to the control and processing unit 3 via the third communications interface $C_3$. The impact shocks (i.e. the kinetic energy as determined by the impact sensor or sensors) of the cuttings particles on the collecting funnel walls may thus be utilized to extract information about the mass, number and distribution of solid particles in the drilling fluid passing through the measuring wheel, per unit of time. The velocities (and thus the kinetic energy) by which the particles impact the collecting funnel wall is determined based on the rotational speed of the measuring wheel. As discussed above, the measuring wheel rotational speed is controlled by the motor and the speed encoder, whereby the acceleration imparted by the measuring wheel on the flow is known.

FIG. 11 is a schematic illustration of a practical application of the invented flowmeter apparatus 10—comprising the mass flowmeter apparatus 50 and the mass density measuring apparatus 79—arranged on a topside installation, e.g. on the deck of a rig, vessel or platform. Although the topside installation per se is not illustrated, the figure illustrates a flare stack 92, riser 84, a blow-out preventer (BOP)

stack 83, and the riser annulus 80. The annular flow is directed into the first inlet 52.

The invention thus allows for an alternative way of venting of gases entrained in the fluid returned from the wellbore. As the returned drilling fluid may contain gases and the fluid is projected on the container 49 wall with a large velocity, as described above, entrained gases may likely be released while the drilling fluid passes through the mass flowmeter apparatus 10. Therefore, the gases (including air) contained by the mass flowmeter apparatus should be vented (e.g. via the gas vent line 58), to the flare stack 92 or other gas processing equipment. As mentioned above, it is possible to measure the gas composition utilizing a gas sensor, such as a chromatograph 54. In the prior art systems, the gas composition is measured quite far down the flowline, with the risk that some of the gas has already been released to the atmosphere. However, as the invented apparatus (and hence its mass flowmeter apparatus 50) is arranged close to the annulus 80 outlet, the gas composition may be measured at a very early stage, effectively immediately before the drilling fluid egresses the flowmeter apparatus and flows into the mudpit 82.

In one practical embodiment, the mass flowmeter apparatus would need a height drop of approximatively 1 meter between the first inlet 52*a* and the first outlet 60. In some topside installations this requirement might be difficult to fulfill, especially in a retrofit context. However, utilizing a pump (e.g. an Archimedes pump) 81 to lift the drilling fluid and the entrained cuttings, as illustrated in FIG. 12, the height drop requirement can be bypassed at the expense of a longer apparatus. In another embodiment of the apparatus, the Archimedes pump 81 may be installed perpendicularly to the flow line therefore not requiring a longer apparatus but more lateral space. An Archimedes pump is capable of lifting slurries and—if sufficiently large—is unlikely to get clogged. It can run dry for a long period of time without being damaged and requires very little maintenance. However, the angle of the Archimedes screw cannot exceed 45° (in practice is should be lower than this limit).

It will be understood that wires, control cables, power cables, and other means and devices required to operate the invented flowmeter apparatus, are not shown as these are commonly known in the art.

In the embodiments described above, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As a person skilled in the art readily will understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

What is claimed is:

1. A flowmeter apparatus for determining a volumetric flowrate for a well flow out from a wellbore, comprising: a mass flowmeter having a first inlet configured for receiving well flow and connected to an inlet flowline, and a first outlet configured for discharging well flow to an outlet flowline, such that the mass flowmeter measures a mass flow rate of said well flow; and at least one mass density measuring apparatus, having a second inlet and a second outlet, fluidly connected to the mass flowmeter upstream of said first inlet or downstream of said first outlet, via the second inlet and the second outlet, the second inlet having a flow that is a fraction of flow in the first inlet, and comprising a mass density measuring device and a pump fluidly connected between the second inlet and the second outlet, whereby a portion of said well flow may be controllably fed through the mass density measuring apparatus; wherein: the first inlet is fluidly connected to an inlet funnel first section and an inlet funnel second section; and the mass flowmeter comprises a measuring wheel rotatably arranged below said funnel second section and arranged to receive at least a portion of said well flow.

2. The flowmeter apparatus of claim 1, wherein the mass density measuring apparatus further comprises a cleaning system having a cleaning fluid inlet and a cleaning fluid outlet, and two three-way valves, one upstream of the mass density measuring device and one close to the second outlet, for cleaning an interior of said measuring device.

3. The flowmeter apparatus of claim 1, wherein the mass density measuring device is a vibrating-tube type densitometer.

4. The flowmeter apparatus of claim 1, wherein said inlet funnel first section comprising a filter device dimensioned and arranged to prevent particles greater than a predetermined size from entering said inlet funnel second section.

5. The flowmeter apparatus of claim 4, further comprising a bypass conduit extending between the inlet funnel first section upstream of said filter device, and said first outlet.

6. The flowmeter apparatus of claim 1, wherein said measuring wheel is powered by a motor and the mass flowmeter also comprises a torque sensor configured to measure torque imposed on the measuring wheel by material flowing into the mass flowmeter apparatus.

7. The flowmeter apparatus of claim 1, wherein at least said measuring wheel is encased by a container, in a wall of at least a portion of which is arranged one or more impact sensors, configured to measure sound levels and frequencies on the container wall.

8. The flowmeter apparatus of claim 7, further comprising a control and processing unit, configured for receiving information via communications interfaces from at least one of the mass flowmeter, the one or more impact sensors, and the mass density measuring apparatus, and to provide information related to said well flow.

9. The flowmeter apparatus of claim 8, wherein the provided information comprises a volumetric flow rate, and/or information concerning the mass, number and mass distribution of solid particles in said well flow, and the information concerning the mass, number and mass distribution of the solid particles are obtained by said one or more impact sensors.

10. The flowmeter apparatus of claim 7, further comprising a gas sensor arranged in fluid connection with the container.

11. The flowmeter apparatus of claim 10, wherein the gas sensor is fluidly connected to a region downstream of the inlet funnel first section.

12. The flowmeter apparatus of claim 1, wherein the well flow is a drilling fluid containing a mixture of fluids and particles.

13. A system for determining a volumetric flowrate for a well flow out from a wellbore, comprising the flowmeter apparatus of claim 1 arranged on a platform, rig, vessel, or other topside location, and wherein the inlet flowline is connected to a riser and the outlet flowline is connected to downstream processing equipment.

14. The system of claim 13, wherein the flowmeter apparatus is arranged proximal to an outlet from an annulus in the riser.

15. The system of claim 13, further comprising a pump arranged between an outlet of the riser and the inlet flowline.

16. A method of determining a volumetric flowrate for a well flow out from a wellbore, comprising measuring a mass flow rate of the well flow, and measuring the mass density of a portion of said well flow, wherein said measurements are obtained by the flowmeter apparatus of claim 1, and by adjusting rotational speed of the measuring wheel as a function of the mass flowrate of fluid flowing into the measuring wheel.

17. The method of claim 16, wherein the measuring wheel rotational speed is adjusted by adjustment of the rotational speed of a drive unit.

18. The method of claim 16, wherein the mass and number of solid particles and their distribution in the well flow are determined by sensing sound levels and frequencies of particles impinging on a wall portion of the mass flowmeter container.

19. The method of claim 18, wherein the particles are accelerated and thus are given an additional momentum before impinging on the wall portion.

20. The method of claim 16, wherein the mass density is determined by extracting a fraction of the well flow, upstream or downstream of the mass flowmeter, and feeding said fraction through a densitometer.

21. The flowmeter apparatus of claim 1, wherein the second inlet is arranged in a lower portion of a fluid flowline wall and is furnished with a restriction such that only fluids and particles below a predetermined size are admitted into the mass density measuring apparatus.

* * * * *